United States Patent [19]
Karikawa

[11] 4,192,600
[45] Mar. 11, 1980

[54] FILM FEED MECHANISM FOR A SPACED APART TAKE-UP SHAFT AND FILM TAKE-UP SPOOL

[75] Inventor: Tohru Karikawa, Tokyo, Japan

[73] Assignee: Asahi Kogaku Kogyo Kabushiki Kaisha, Tokyo, Japan

[21] Appl. No.: 926,066

[22] Filed: Jul. 19, 1978

[30] Foreign Application Priority Data

Jul. 19, 1977 [JP] Japan .............................. 52-96419[U]

[51] Int. Cl.$^2$ .............................................. G03B 1/14
[52] U.S. Cl. .................................................. 354/212
[58] Field of Search ............... 354/204, 206, 212, 213, 354/275

[56] References Cited

U.S. PATENT DOCUMENTS

| | | | |
|---|---|---|---|
| 2,227,964 | 1/1941 | Drotning et al. | 354/206 |
| 2,241,122 | 5/1941 | Drotning | 354/213 X |
| 3,741,097 | 6/1973 | Fukuda et al. | 354/212 |
| 3,978,501 | 8/1976 | Sanada | 354/204 X |

*Primary Examiner*—Donald A. Griffin

*Attorney, Agent, or Firm*—Sughrue, Rothwell, Mion, Zinn and Macpeak

[57] ABSTRACT

The present invention is a film feed mechanism having a take-up shaft spaced apart from the film take-up spool. A bell crank is connected via a link to a conventional film feed control disc coupled to the take-up shaft. The reciprocal movement of the link is applied to the bell crank. The bell crank is provided with a first pawl and a second pawl. When the bell crank is moved to the right, the first pawl is in engagement with a first gear, which via second and third gears, causes the spool gear to be rotated counter-clockwise; however, the second pawl is slidingly disengaged from a rotating fourth gear. When the bell crank is moved to the left, the second pawl is in engagement with the fourth gear, which via a fifth, second and third gears cause the spool gear to be rotated counter-clockwise; however, the first pawl is slidingly disengaged from the rotating first gear. Thus, the present invention causes the spool gear to be rotated counter-clockwise in both directions of reciprocal movement of the link, and consequently, provides a widing torque of substantially constant level to the spool gear.

3 Claims, 7 Drawing Figures

FILM FEED MECHANISM FOR A SPACED APART TAKE-UP SHAFT AND FILM TAKE-UP SPOOL

BACKGROUND OF THE INVENTION

1. Field of the Invention

The present invention relates generally to film feed mechanism for cameras, and more particularly, to film feed mechanisms for cameras where the take-up shaft and the film take-up spool are spaced apart from each other.

2. Description of the Prior Art

In a camera, the preferred arrangement is to have the film take-up spool disposed in the vicinity of the take-up shaft. In a camera arrangement where the take-up shaft and the film take-up spool are spaced apart from each other, maximum ease of operation requires a complicated transmission mechanism within the body of the camera, particularly in the case where an unidirectional rotating take-up shaft is employed.

Japanese Patent Application No. 52-69,725 is directed to a transmission mechanism where a unidirectional rotating take-up shaft is employed, and this Japanese Patent Application is incorporated by reference into the present application. Briefly stated, in Japanese Patent Application No. 52-69,725, the rotational movement of a film feed controlled disc, which is derived from the take-up shaft, is converted into reciprocating movement of a bell crank by the use of a link. The reciprocating movement, in turn, is converted into intermittent unidirectional rotation of a take-up spool by the use of a one-way clutch. However, the intermittent unidirection rotation that is produced causes the level of torque applied to the film during the take-up operation to be very uneven.

The film feeding mechanism disclosed in Japanese Patent Application No. 52-69,725 is shown in FIG. 1. To facilitate the explanation, the film feed stopping mechanism, the take-up operation interrupting mechanism, and the mirror and shutter setting mechanism have been omitted. Referring to FIG. 1, a gear 1 is coupled to the take-up shaft (not shown). The take-up shaft rotates in only one direction, and causes gear 1 to rotate only in the clockwise direction, as indicated by the associated arrow. Gear 1 meshes with a setting gear 2, which meshes with a gear 3. Thus, gear 3 also rotates only in the clockwise direction, as indicated by the associated arrow. Mounted on gear 3 is a film feed control disc 4. A link 6 is coupled at a first end to the film feed control disc 4 by a shaft 5, and at a second end to a bell crank 8 by a shaft 7. Bell crank 8 is mounted for rotation on a shaft 8a. Thus, the clockwise rotation of the film feed control disc 4 causes link 6 to move reciprocally, which causes bell crank 8 to move reciprocally, as indicated by the associated arrow.

A driving gear 11 is also mounted for rotation on shaft 8a. A pawl 9 coupled by a shaft 8b to bell crank 8 is urged by a spring 10 against the teeth of driving gear 11. Because of the shape of the teeth of driving gear 11 and the orientation of pawl 9, pawl 9 only engages the teeth of driving gear 11 when bell crank 8 is being moved reciprocally to the right. Thus, bell crank 8, pawl 9, spring 10 and driving gear 11 constitute a one-way clutch which causes gear 11 to be rotated clockwise when bell crank 8 is moved reciprocally to the right.

A gear 12 is also mounted for rotation by shaft 8a and is rigidly secured to driving gear 11. Gear 12 rotationally connected to a spool gear 16 by way of a series of gears 13, 14 and 15. In addition, a spring 17 acts to prevent counterclockwise rotation of gear 12. Thus, when gear 12 rotates in an intermittent clockwise fashion, spool gear 16, associated with the film take-up spool, correspondingly rotates in an intermittent counterclockwise fashion.

As stated above, because gear 12 is rotated only when the bell crank 8 is being moved reciprocally to the right, the level of torque applied via spool gear 16 to the film during the take-up operation is very uneven.

SUMMARY OF THE INVENTION

It is an object of the present invention to provide a improved film feed mechanism for a camera having a take-up shaft and a film take-up spool which are spaced apart from each other.

It is a further object of the present invention to provide a film feed mechanism where the level of torque applied by the spool gear to the film during the take-up operation is substantially constant.

It is another object of the present invention to provide a film feed mechanism where the conversion of reciprocal movement to rotational movement takes place in both directions of the reciprocal movement.

These objects are achieved by the film feed mechanism of the present invention. The present invention is a film feed mechanism having a take-up shaft spaced apart from the film take-up spool. The bell crank is connected via a link to a conventional film feed control disc coupled to the take-up shaft. The reciprocal movement of the link is applied to the bell crank. The bell crank is provided with a first pawl and a second pawl. When the bell crank is moved to the right, the first pawl is in engagement with a first gear, which via second and third gears, causes the spool gear to be rotated counterclockwise; however, the second pawl is slidingly disengaged from a rotating fourth gear. When the bell crank is moved to the left, the second pawl is in engagement with the fourth gear, which via a fifth, second and third gears cause the spool gear to be rotated counter-clockwise; however, the first pawl is slidingly disengaged from the rotating first gear. Thus, the present invention causes the spool gear to be rotated counter-clockwise in both directions of reciprocal movement of the link, and consequently, provides a winding torque of substantially constant level to the spool gear.

DETAILED DESCRIPTION OF THE PREFERRED EMBODIMENT

Figure 1:
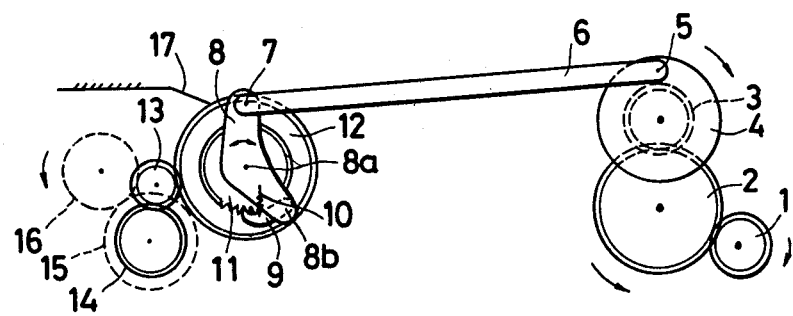
FIG. 1 is a top plan view of a conventional film feed mechanism which includes a one-way clutch having bell crank 8, pawl 9 and spring 10.
Figure 2:
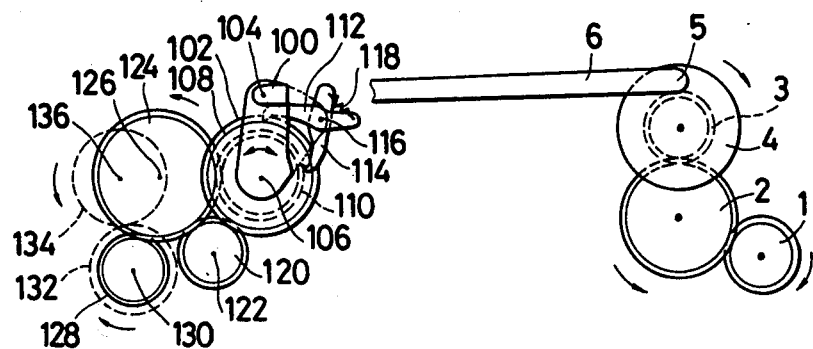
FIG. 2 is a top plan view of the film feed mechanism of the present invention.

Referring now to FIG. 2, the film feed mechanism of the present invention is shown. It should be noted that the components of the present invention that are designated by the reference numerals 1-7 in FIG. 2 correspond in structure and function to the like-number components in Japanese Patent Application No. 52-69,725, as described above and as shown in FIG. 1.

Figure 3:
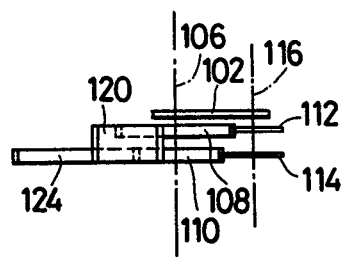
FIG. 3 is a side view of the reciprocation-to-rotation mechanism of the present invention as shown in FIG. 2.

Referring again to FIG. 2, the second end 100 of link 6 is coupled for reciprocal movement to a bell crank 102 by a shaft 104. Bell crank 102 is mounted for rotation by a shaft 106. A gear 108 and a gear 110 are mounted for rotation by shaft 106, as shown in FIG. 3. It should be noted that gears 108 and 110 rotate independently of each other and independently of bell crank 102.

As shown in FIGS. 2 and 3, a pawl 112 and a pawl 114 are mounted for independent rotation to bell crank 102 by a shaft 116. The first ends of pawls 112 and 114 are coupled together by a spring 118. Spring 118 provides a bias force to pawls 112, 114, which urges the second end of pawl 112 into pressing contact with the teeth of gear 108 and urges the second end of pawl 114 into pressing contact with the teeth of gear 110.

Referring to FIGS. 2, 3, 4B and 4D, with respect to pawl 112, the teeth of gear 108 mesh with the teeth of a gear 120. Gear 120 is mounted for rotation by a shaft 122. The teeth of gear 120 also mesh with a gear 124, which is mounted for rotation by a shaft 126. In turn, the teeth of gear 124 mesh with the teeth of a gear 128, which is mounted for rotation by a shaft 130. A gear 132 is also mounted for rotation by shaft 130 and is rigidly secured to gear 128. The teeth of gear 132 mesh with the teeth of a spool gear 134, which is mounted for rotation by a shaft 136. As is explained in detail below, gear 108 only rotates counter-clockwise, with respect to FIGS. 2, 4B and 4D, which causes spool gear 134 through gears 120, 124, 128 and 132, to rotate only in a counter-clockwise direction.

Referring to FIGS. 2, 3, 4A and 4C, with respect to pawl 112, the teeth of gear 110 also mesh with the teeth of gear 124. The teeth of gear 124, in turn, mesh with the teeth of gear 128. As is explained in detail below, gear 110 only rotates in the clockwise direction, with respect to FIGS. 2, 3, 4A and 4C, which causes spool gear 134 through gears 124, 128 and 132 to rotate only in a counter-clockwise direction.

Figure 4A:
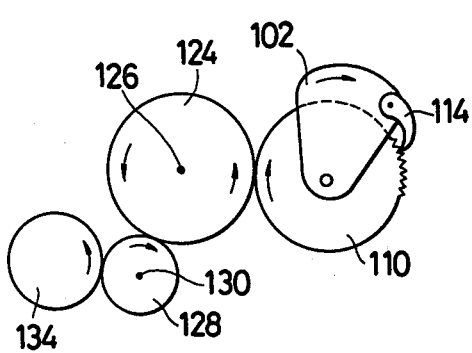
FIGS. 4A and 4B are diagrammatic top plan views of the operation of the elements associated with pawls 112, 114, respectively, of the reciprocation-to-rotation mechanism for the case when link 6 is moved to the right, as referenced to FIG. 2.
Figure 4C:
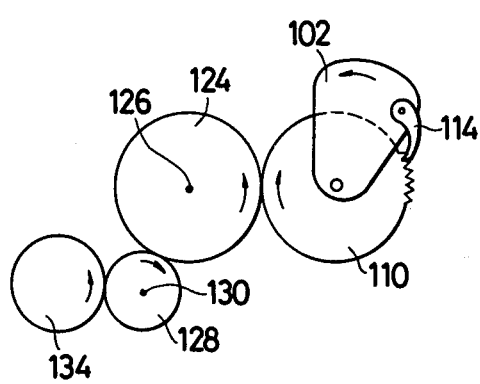
FIGS. 4C and 4D are diagrammatic top plan views of the operation of the elements associated with pawls 112, 114, respectively, of the reciprocation-to-rotation mechanism for the case when link 6 is moved to the left, as referenced to FIG. 2.
Figure 4B:
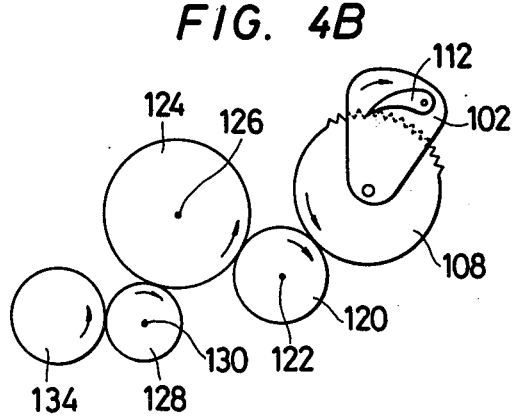

The operation of the present invention when link 6 is being moved to the right, as referenced to FIGS. 2, 4A, and 4B, will now be described. The shape of the teeth of gear 110 and the orientation of pawl 114 causes pawl 114 to be in engagement with gear 110, which causes gear 110 to be rotated clockwise because bell crank 102 is being moved to the right by link 6. The clockwise rotation of gear 110 causes spool gear 134 via gears 124, 128 and 130 to be rotated counter-clockwise. Simultaneously, the counter-clockwise rotation of spool gear 134 through gears 130, 128, 124, and 120 causes gear 108 to be rotated counter-clockwise. However, the shape of the teeth of gear 108 and the orientation of pawl 112 causes pawl 112 to slide over the teeth of gear 108 and thus to be disengaged with gear 108.

Figure 4D:
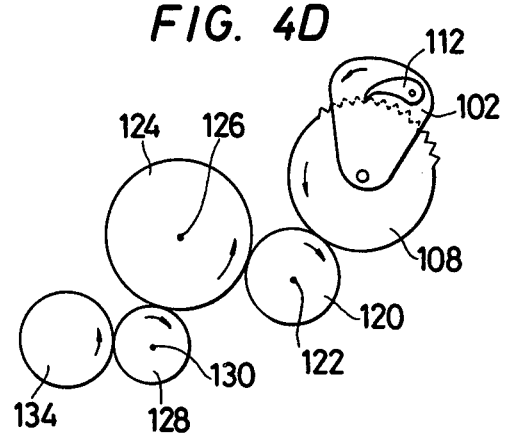

The operation of the present invention when link 6 is being moved to the left, as referenced to FIGS. 2, 4C, and 4D, will now be described. The shape of the teeth of gear 108 and the orientation of pawl 112 causes pawl 112 to be in engagement with gear 108, which causes gear 108 to be rotated counter-clockwise because bell crank 102 is being moved to the left by link 6. The counter-clockwise rotation of gear 108 causes spool gear 134 via gears 120, 124, 128, and 130 to be rotated counter-clockwise. Simultaneously, the counter-clockwise rotation of spool gear 134 through gears 130, 128 and 124 causes gear 110 to be rotated clockwise. However, the shape of the teeth of gear 110 and the orientation of pawl 114 causes pawl 114 to slide over the teeth of gear 110 and thus to be disengaged with gear 110.

As is apparent from the description above, spool gear 134 is rotated counter-clockwise when bell crank 102 is moved to the right by link 6 and when bell crank 102 is moved to the left by link 6. This conversion of the reciprocal movement to rotational movement in both directions of the reciprocal movement results in the present invention providing a winding torque of substantially constant level to the spool gear 134.

What is claimed is:

1. In a camera film feed mechanism of the type having a film take-up shaft adapted to rotate in only one direction and a link secured at a first end to a control disc coupled to a take-up shaft, said link exhibiting reciprocating movement in a first direction and a second direction opposite said first direction when said take-up shaft is rotated, the improvement comprising:
    means coupled to said second end of said link for converting said reciprocating movement in both said first and said second directions into a rotational movement of only one direction and for providing said rotational movement to a spool gear associated with said film take-up shaft.

2. The film feed mechanism as recited in claim 1, wherein said means includes a bell crank mounted for rotation on a first shaft, said link coupled to said bell crank, a first gear mounted for rotation on said first shaft, a second gear mounted for rotation on said first shaft, a first pawl mounted for rotation on said bell crank to engage said first gear only when said bell crank is reciprocally moved in said first direction, a second pawl mounted for rotation on said bell crank to engage said second gear only when said bell crank is reciprocally moved in said second direction, a third gear meshed with said second gear, a fourth gear meshed with said first gear and with said third gear, and a fifth gear meshed with said fourth gear and meshed with said spool gear.

3. The film feed mechanism as recited in claim 1, wherein said means includes a bell crank coupled to said link and having a first pawl adapted to operate during said reciprocal movement in said first direction and a second pawl adapted to operate during said reciprocal movement in said second direction, a first and a second gear mounted coaxially with said bell crank, said first gear being associated with said first pawl and said second gear being associated with said second pawl, said first gear being directly meshed with a train of gears for driving said spool gear, and said second gear being meshed by way of an idle gear with said train of gears.

* * * * *